(12) United States Patent
Ito

(10) Patent No.: US 6,989,908 B1
(45) Date of Patent: Jan. 24, 2006

(54) IMAGE INPUT AND OUTPUT METHOD, IMAGE INPUT AND OUTPUT APPARATUS, AND IMAGE PROCESSING SYSTEM

(75) Inventor: Hirohiko Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/172,261

(22) Filed: Oct. 14, 1998

(30) Foreign Application Priority Data

Oct. 21, 1997 (JP) .............................................. 9-288502

(51) Int. Cl.
*H04N 1/04* (2006.01)

(52) U.S. Cl. ...................... 358/1.15; 358/474; 358/448; 358/405

(58) Field of Classification Search .................. 358/474, 358/296, 453, 447, 300, 537, 450, 7.15, 448, 358/404, 405; 505/486, 488, 496, 498, 1.15

See application file for complete search history.

(56) References Cited

U.S. PATENT DOCUMENTS

| | | | | | |
|---|---|---|---|---|---|
| 5,422,743 | A | * | 6/1995 | Farrel | 358/537 |
| 5,452,068 | A | * | 9/1995 | Farrel | 355/321 |
| 5,734,482 | A | * | 3/1998 | Miyamoto | 358/444 |
| 5,812,278 | A | * | 9/1998 | Toyoda | 358/402 |
| 6,088,550 | A | * | 7/2000 | Asai | 399/79 |

* cited by examiner

*Primary Examiner*—Scott Rogers
*Assistant Examiner*—Negussie Worku
(74) *Attorney, Agent, or Firm*—Fitzpatrick, Cella, Harper & Scinto

(57) ABSTRACT

Image is processing of one image processing unit to be performed is decided into an image input job in which image data is input from an image input section and an image output job in which image data is output to an image output section. Execution of the image input job and that of the image output job are controlled independently. After a preceding image input job is finished, a new image input job is started before the image output job corresponding to the preceding image input job is finished.

21 Claims, 12 Drawing Sheets

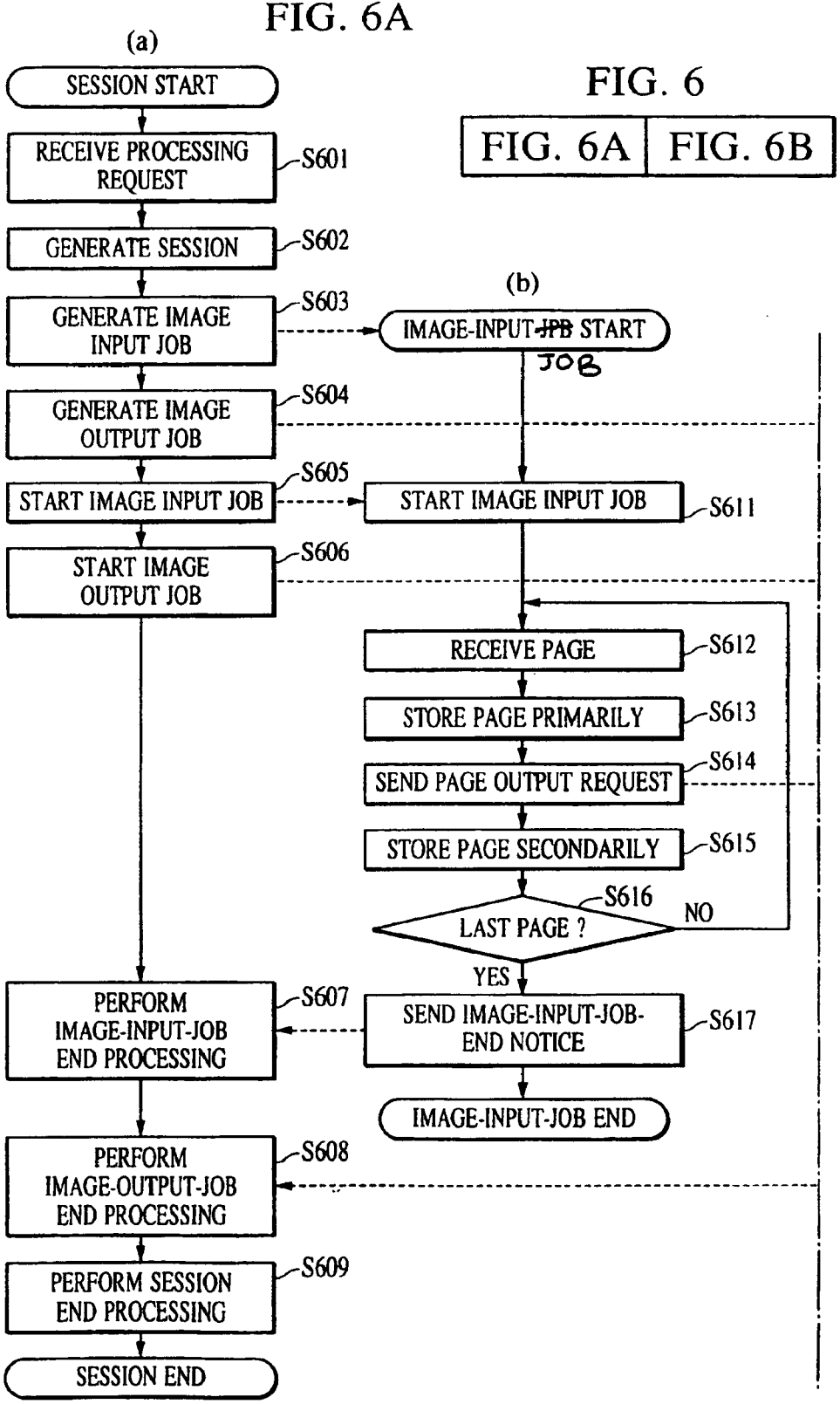

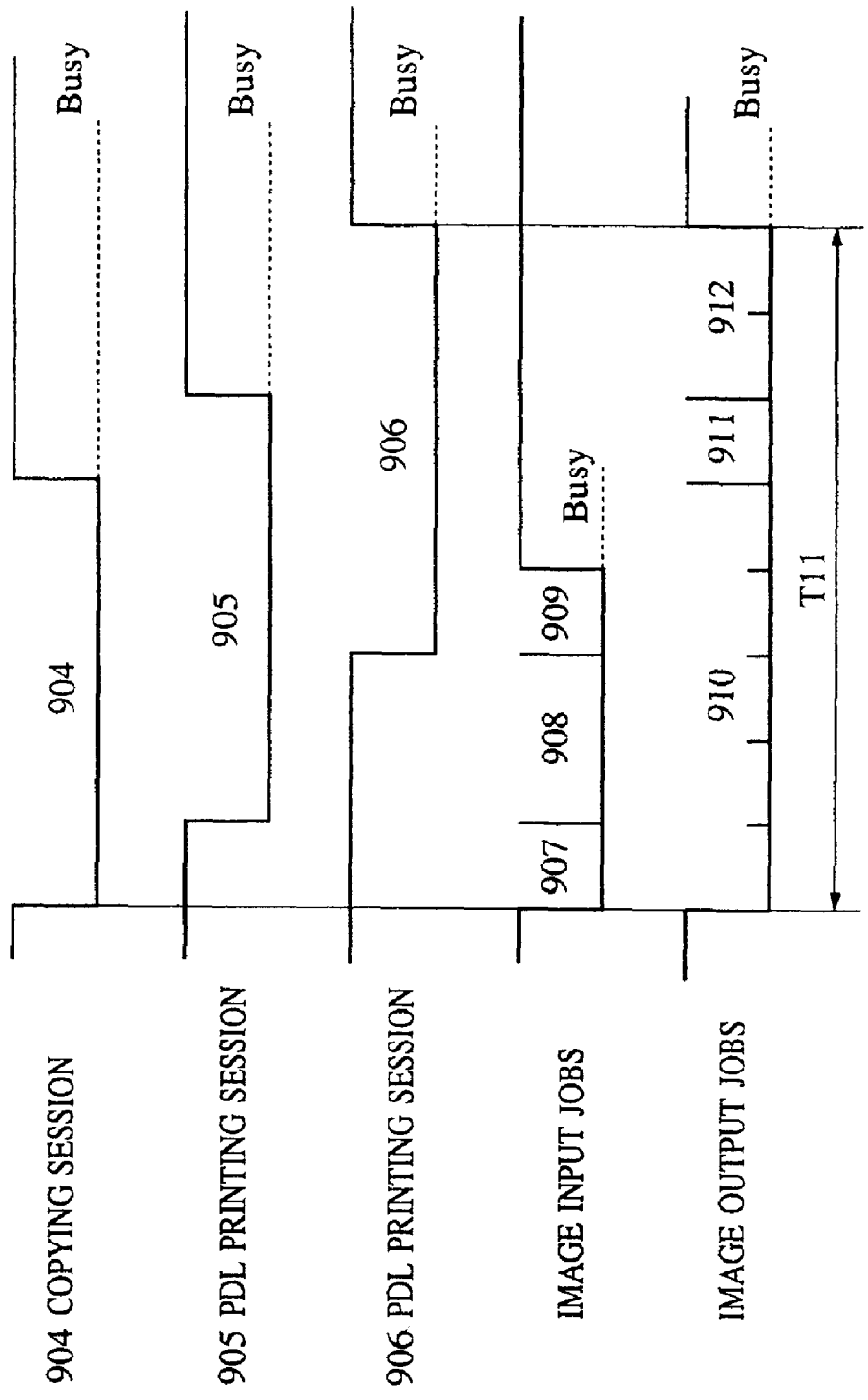

IMAGE INPUT AND OUTPUT METHOD, IMAGE INPUT AND OUTPUT APPARATUS, AND IMAGE PROCESSING SYSTEM

BACKGROUND OF THE INVENTION

1. Field of the Invention

The present invention relates to an image input and output method, an image input and output apparatus, and an image processing system in which various types of image data are input and output through a recording medium.

2. Description of the Related Art

As copy machines have been digitized in recent years, a versatile office machine having a plurality of functions has become commercially available, which performs facsimile transmission and receiving with the use of the scanning and printing functions of its copying section and which develops data written in a page description language (PDL) sent from a computer to print it out. Such a versatile office machine is configured so as to operate with the combined use of a plurality of functions, such as facsimile transmission of a developed PDL image, as well as so as to operate by the use of a single function, such as a copying function, a facsimile function, and a PDL printing function. The versatile office machine is also configured such that it can be connected to various types of image processing units, including a computer, through a local area network (LAN) to allow the image processing units to use the functions of the versatile office machine.

In such a versatile office machine, a control program for a printer section is shared in a copying function, a PDL printing function, and a facsimile printing function, and a control program for a reader section is also shared in the copying function, a facsimile reading function, and a scanning function. Therefore, the amount of control programs which implement various types of functions is reduced, and the desired functions are economically and simply implemented.

The versatile office machine is configured such that an image input and output operation for a unit function is finished and then the next image input and output operation for another unit function starts. However, a waiting period is required in many cases, such as a case in which, while copying is being performed, an operation for inputting into a hard disk image data obtained by developing a PDL sent from a computer is suspended until copying is finished and a case in which, while developed PDL image data is being read from a hard disk for printing, an original reading operation for copying is suspended until the PDL printing is finished, causing the user who wants to copy to wait until the versatile office machine completes printing.

SUMMARY OF THE INVENTION

Accordingly, it is an object of the present invention to provide an image input and output method, an image input and output apparatus, and an image processing system in which a plurality of functions can be performed at the same time and a plurality of users have to wait for as little time as necessary for obtaining the desired results after the processing starts.

The foregoing object is achieved in one aspect of the present invention through the provision of an image input and output method in which image data is input from at least one image input section and the input image data is output to at least one image output section, including the steps of: dividing image processing of one image processing unit to be performed into an image input job in which image data is input by the image input section and an image output job in which image data is output by the image output section; controlling execution of the image input job and that of the image output job independently; and after a preceding image input job is finished, starting a subsequent image input job before the image output job corresponding to the preceding image input job is finished.

The foregoing object is achieved in another aspect of the present invention through the provision of an image input and output apparatus including: input means for inputting image data from at least one image input section; output means for outputting image data to at least one image output section; obtaining means for obtaining image processing parameters which regulate image processing of one image processing unit to be performed; and controlling means for controlling an input of image data and an output of image data according to the image processing parameters obtained by the obtaining means; wherein the controlling means divides the image processing of one unit expressed by the image processing parameter obtained by the obtaining means into an image input job in which image data is input by the image input means and an image output job in which image data is output by the output means; controls execution of the image input job and that of the image output job independently; and after a preceding image input job is finished, starts a subsequent image input job before the image output job corresponding to the preceding image input job is finished.

The foregoing object is achieved in still another aspect of the present invention through the provision of an image processing system in which image data input by at least one image input means is output by at least one image output means, including: obtaining means for obtaining image processing parameters which express image processing of one image processing unit to be performed; and controlling means for controlling an input of image data and an output of image data according to the image processing parameter obtained by the obtaining means; wherein the controlling means divides the image processing of one unit expressed by the image processing parameter obtained by the obtaining means into an image input job in which image data is input by the image input means and an image output job in which image data is output by the output means; controls execution of the image input job and that of the image output job independently; and after a preceding image input job is finished, starts a subsequent image input job before the image output job corresponding to the preceding image input job is finished.

The foregoing object and advantages, and further objects and advantages of the present invention will become apparent from the following description of the preferred embodiment in light of the appended drawings.

BRIEF DESCRIPTION OF THE DRAWINGS

FIG. 11 is a timing chart showing another operation timing of the sessions and jobs.

DESCRIPTION OF THE PREFERRED EMBODIMENT

Figure 1:
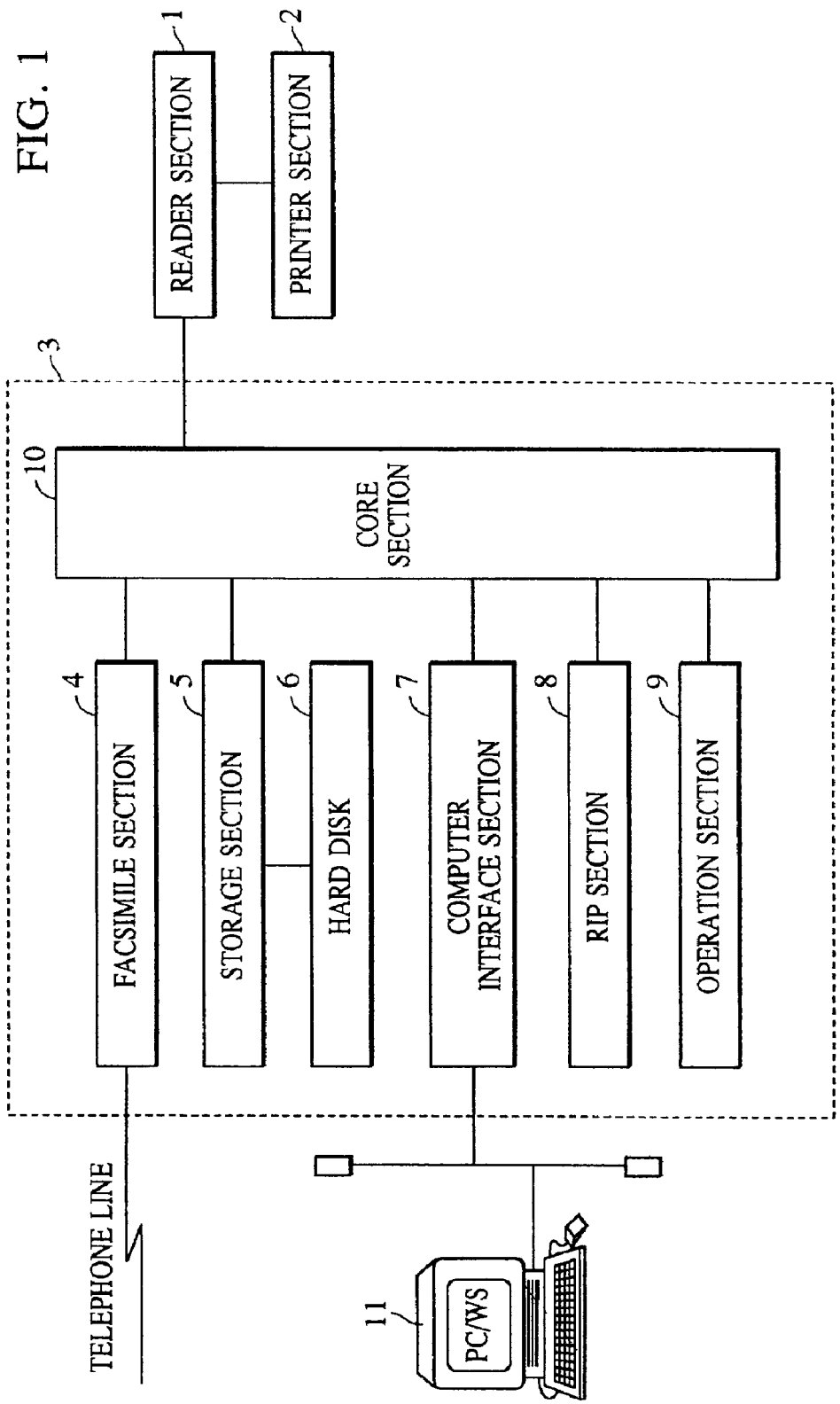
FIG. 1 is a block diagram of an image input and output control apparatus according to an embodiment of the present invention.

FIG. 1 is a block diagram of an image input and output control apparatus according to an embodiment of the present invention.

In FIG. 1, a reader section 1 photoelectrically reads a original image with the use of a CCD image sensor and outputs the image data corresponding to the original image to an image input and output control section 3. A printer section 2, which is a laser beam printer for example, records the image corresponding to the image data sent from the image input and output control section 3 onto a recording sheet. The image input and output control section 3 is connected to the reader section 1 and the printer section 2. The section 3 includes a facsimile section 4, a storage section 5, a computer interface section 7, a raster image processor (RIP) section 8, an operation section 9, and a core section 10.

The facsimile section 4 decompresses compressed image data received through a telephone line, and sends the decompressed image data to the core section 10. The section 4 also compresses image data sent from the core section 10 and transmits the compressed image data through the telephone line. Image data to be transmitted or received can be temporarily stored in a hard disk 6 connected to the storage section 5.

The storage section 5, connected to the hard disk 6, compresses image data sent from the core section 10 and stores it together with the corresponding ID number for retrieving the image data onto the hard disk 6. According to code data sent through the core section 10, the storage section 5 also retrieves the corresponding compressed image data from the hard disk 6. The section 5 reads and decompresses the retrieved compressed image data and sends the decompressed image data to the core section 10.

The computer interface section 7 serves as an interface between the core section 10 and a personal computer (PC) or a workstation (WS) 11. The computer interface section 7 may be connected to the PC/WS 11 in the form of one-to-one-correspondence local interface, or through a network.

The RIP section 8 develops the code data (PDL) which expresses an image sent from the PC/WS 11 to obtain image data which can be recorded by the printer section 2.

The operation section 9 is provided with a touch-sensitive display and a key for an operation instruction or an operation setting from the user to the image input and output control apparatus through a user interface.

The core section 10 (details thereof will be described later) controls data flow among the reader section 1, the printer section 2, the facsimile section 4, the storage section 5, the computer interface section 7, the RIP section 8, and the operation section 9.

Figure 2:
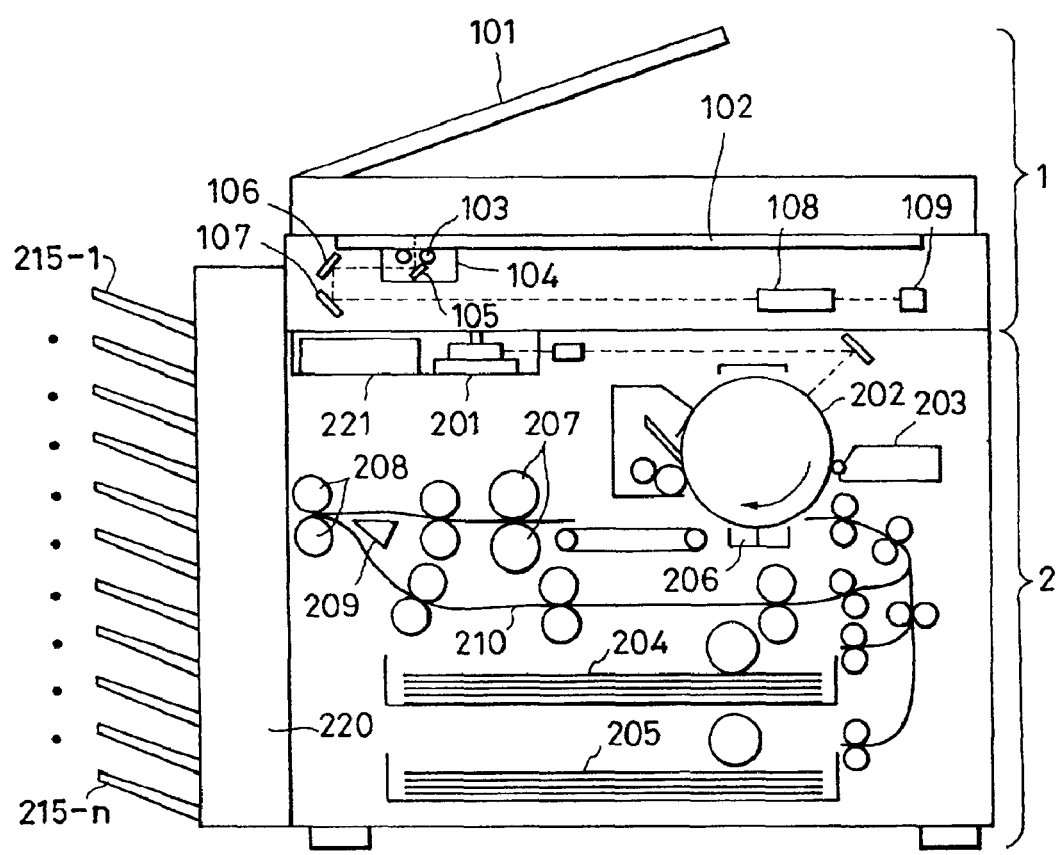
FIG. 2 is a cross section of a reader section and a printer section.

FIG. 2 is a cross section of the reader section 1 and the printer section 2. An original feed unit 101 in the reader section 1 feeds a plurality of originals set at a certain stack position by the user to a platen glass 102 sequentially from the top one by one, and discharges the originals on the platen glass 102 to a certain discharge position after the originals are read. When an original is fed to the platen glass 102, a lamp 103 is turned on and a scanner unit 104 starts moving to perform exposure scanning for the original. Light reflected from the original is directed to a CCD image sensor (hereinafter just called a CCD) 109 through mirrors 105, 106, and 107 and a lens 108. The image of the scanned original is photoelectrically converted and read by the CCD 109 in this way. Processing such as A/D conversion, shading correction, and the desired editing is applied to image data output from the CCD 109 and then the image data is transferred to the core section 10 in the image input and output control section 3.

A laser driver 221 in the printer section 2 drives a laser emitting section 201 so that the laser emitting section 201 emits the laser beam corresponding to image data output from the core section 10 in the image input and output control section 3. The laser beam is incident upon a photosensitive drum 202 to form the latent image corresponding to the laser beam on the photosensitive drum 202. A developing unit 203 attaches developer to the portion where the latent image is formed on the photosensitive drum 202.

At a timing in synchronization with the start of emission of the laser beam, a recording sheet is supplied from either of a cassette 204 and a cassette 205 and fed to a transfer section 206, and the developer attached to the photosensitive drum 202 is transferred to the recording sheet. The recording sheet with the developer is fed to a fixing section 207. The developer is fixed on the recording sheet by heat and pressure in the fixing section 207. The recording sheet which has passed through the fixing section 207 is discharged by discharging rollers 208. A sorter 220 sorts a discharged recording sheet to place it into each bin 215-1 through 215-n and staples sorted recording sheets. The sorter 220 accommodates recording sheets at the highest bin 215-1 if sorting is not specified. When both-surface recording is specified, a recording sheet on which data has been recorded at one surface is fed to the discharging rollers 208, the direction of rotation of the discharging roller 208 is reversed, and the recording sheet is led to a refeed path 210 by a flapper 209. The recording sheet led to the refeed path 210 is fed to the transfer section 206 at the above-described timing and an image is recorded on the other surface of the recording head.

Figure 3:
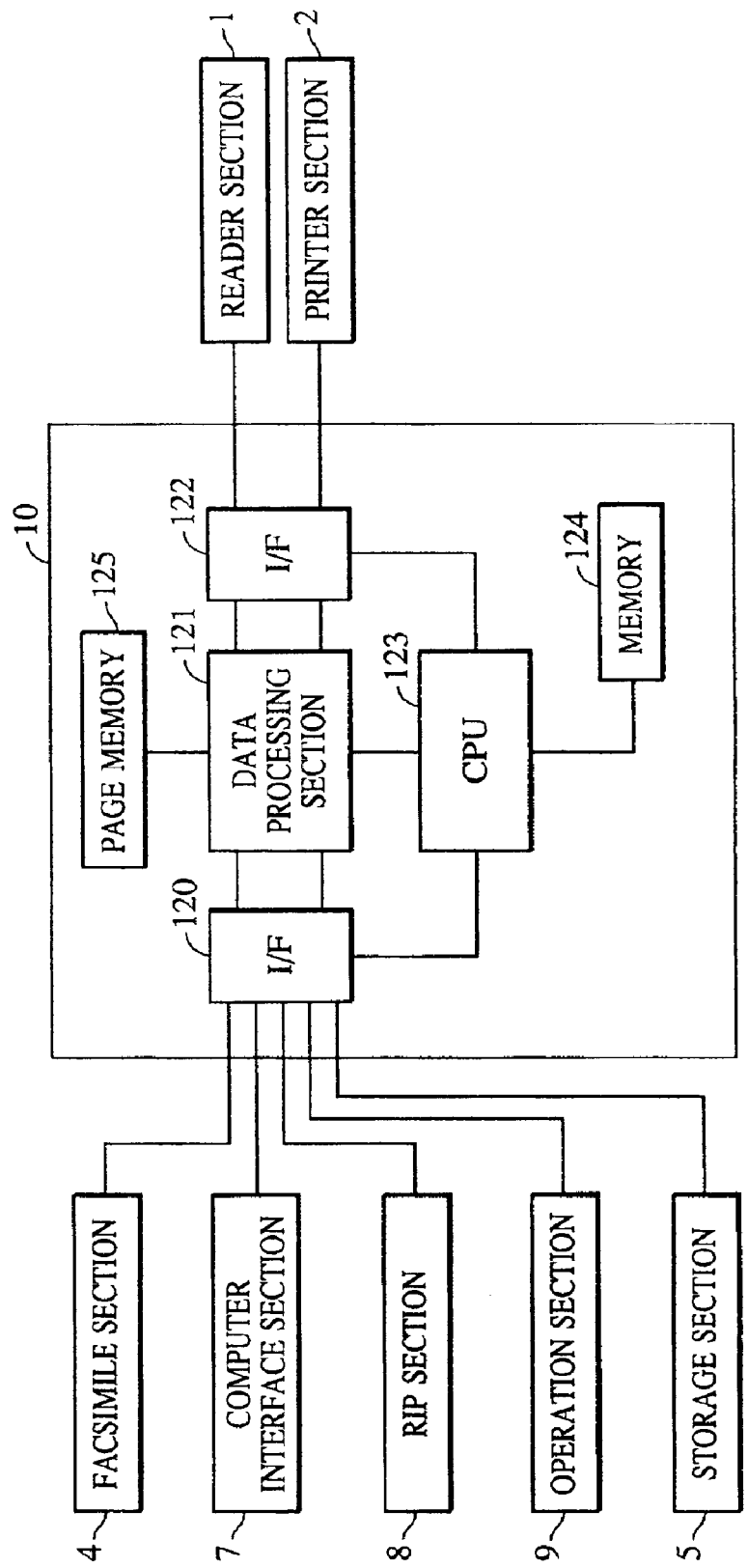
FIG. 3 is a block diagram of a core section.

FIG. 3 is a block diagram of the core section 10.

Image data sent from the reader section 1 is sent to a data processing section 121 through an interface 122. The data processing section 121 performs image processing, such as image rotation and image magnification, image-data compression, and image-data decompression. The core section 10 includes a page memory 125 for two pages of image data. Image data sent from the reader section 1 to the data processing section 121 is temporarily stored in the page memory 125, compressed, and sent to the storage section 5 through an interface 120.

The code data (PDL) which expresses an image input through the computer interface section 7 is sent to the data processing section 121 through the interface 120, then sent to the RIP section 8, and developed to obtain the corresponding image data. This image data is sent to the data processing section 121, temporarily stored in the page memory 125, compressed, and sent to the storage section 5.

Image data sent from the facsimile section 4 is sent to the data processing section 121, temporarily stored in the page memory 125, compressed, and sent to the storage section 5.

Image data sent from the storage section 5 is sent to the data processing section 121, decompressed and temporarily stored in the page memory 125, and sent to the printer section 2, the facsimile section 4, or the computer interface section 7.

Image data input to the data processing section 121 and temporarily stored in the page memory 125 can be sent to the printer section 2, the facsimile section 4, or the computer interface section 7 by switching an internal selector before the data is sent to the storage section 5.

A CPU 123 controls various operations according to a control program stored in a memory 124 and a control command sent from the operation section 9. The memory 124 is used also as a work area of the CPU 123.

With the core section 10 at the center, combined processing of functions, such as reading an original image, printing an image, transmitting and receiving an image, storing an image, and inputting and outputting data to and from a computer can be performed through the data processing section 121 and the storage section 5.

Figure 4:
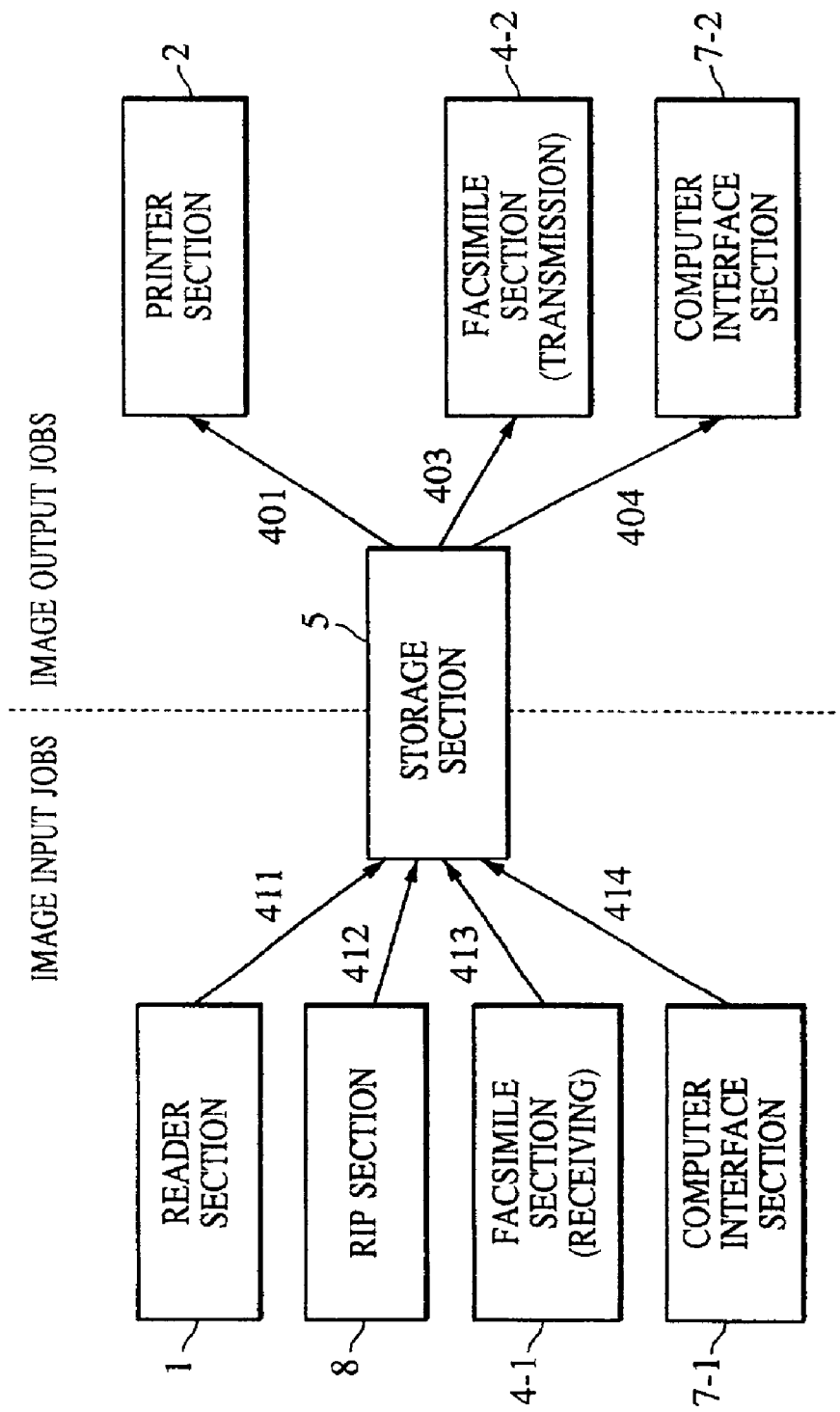
FIG. 4 is a view showing the flows of image input jobs and image output jobs.

Job control performed by the CPU 123 of the core section 10 in the image input and output control apparatus according to the present embodiment will be described next by referring to FIG. 4. FIG. 4 shows units of job control logically.

A job is controlled in units of a series of input and output processing operations performed for a cluster of image data even on a plurality of pages. Jobs controlled in this way are roughly divided into image input jobs and image output jobs.

Image input jobs are further classified into an image input job 411 in which image data read by the reader section 1 is sequentially stored in the storage section 5, an image input job 412 in which image data developed by the RIP section 8 is sequentially stored in the storage section 5, an image input job 413 in which image data received by a facsimile section 4-1 is sequentially stored in the storage section 5, and an image input job 414 in which image data input through a computer interface section 7-1 is sequentially stored in the storage section 5.

Image output jobs are also further classified into an image output job 401 in which image data read from the storage section 5 is sequentially output to the printer section 2, an image output job 403 in which image data read from the storage section 5 is sequentially output to a facsimile section 4-2, and an image output job 404 in which image data read from the storage section 5 is sequentially output to a computer interface section 7-2.

Figure 5:
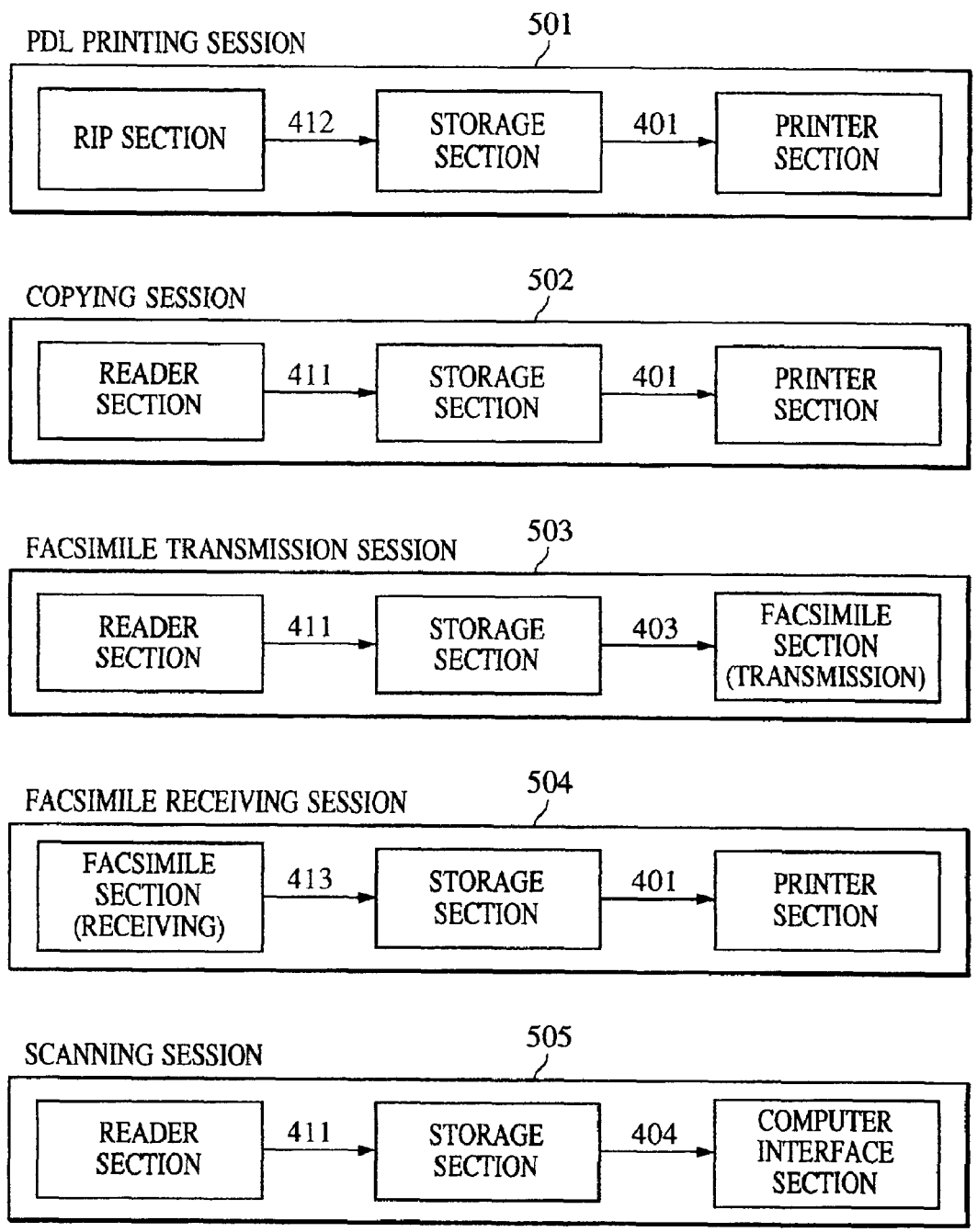
FIG. 5 is a view showing session structures.

FIG. 5 shows some combinations (hereinafter called sessions) of a plurality of jobs.

A PDL printing session 501 includes the image input job 412 and the image output job 401 and is controlled as a unit of processing. A copying session 502 includes the image input job 411 and the image output job 401 and is controlled as a unit of processing. A facsimile transmission session 503 includes the image input job 411 and the image output job 403 and is controlled as a unit of processing. A facsimile receiving session 504 includes the image input job 413 and the image output job 401 and is controlled as a unit of processing. A scanning session 505 includes the image input job 411 and the image output job 404 and is controlled as a unit of processing.

A session is a control unit including one or more jobs. Other than the sessions shown in FIG. 5, there may be a session including the image input job 412 only, a session including the image output job 401 only, and a session including three types of jobs, the image input job 412, the image output job 401, and the image output job 403.

Figure 6B:
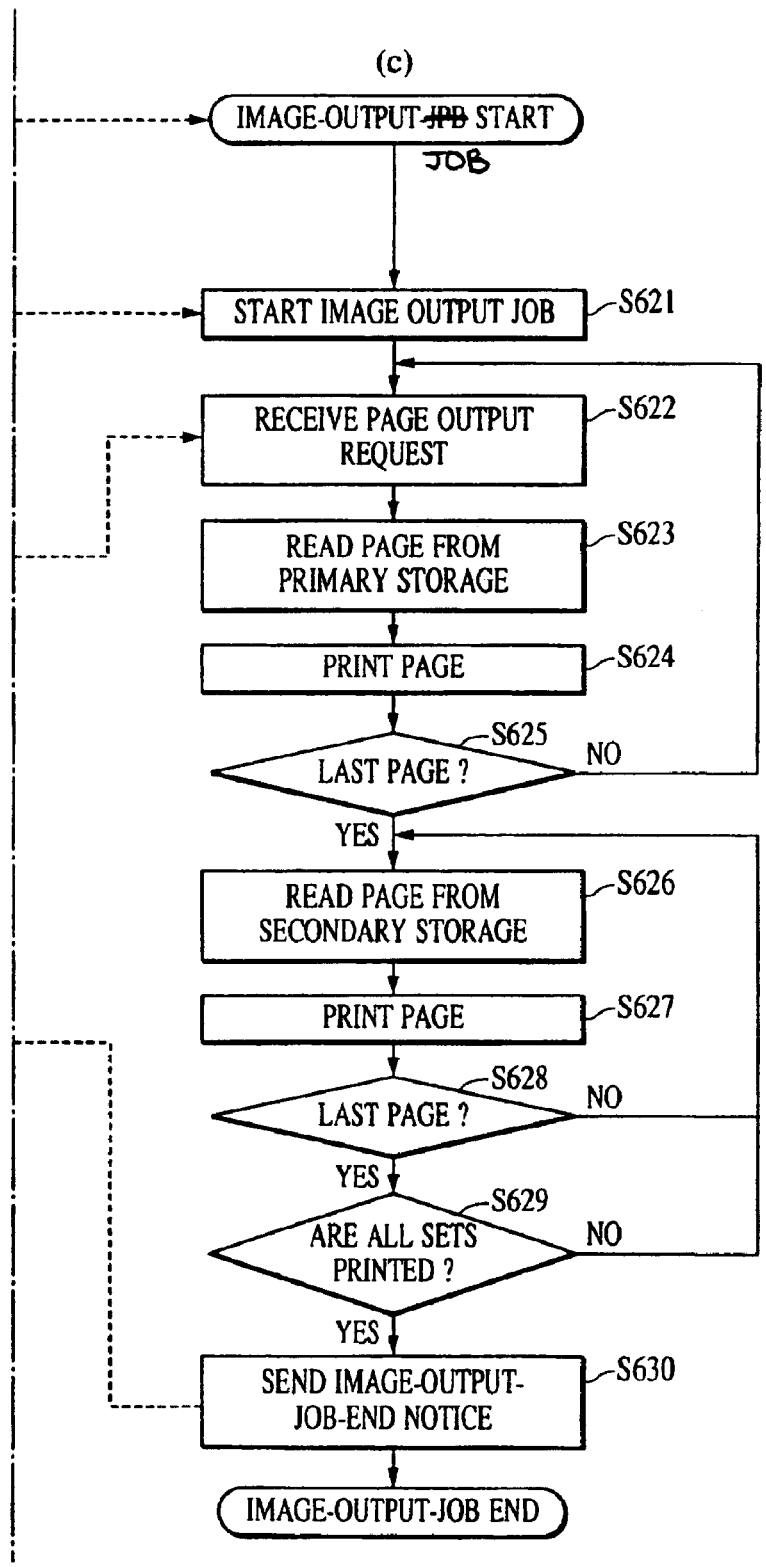
FIG. 6, consisting of FIGS. 6A and 6B, is a flowchart of image input and output control.

FIG. 6 is a flowchart of a control procedure for a session formed of an image input job in which image data is sequentially stored in the storage section 5 and an image output job in which image data stored in the storage section 5 is sequentially printed out at the printer section 2, the procedure handling a session control task and job control tasks performed by the CPU 123 of the core section 10 in the image input and output control apparatus according to the present embodiment. In FIG. 6, S601 to S630 indicate steps. A session control task (a), an image-input-job control task (b), and an image-output-job control task (c) operate in a multi-tasking mode.

Session control and job control in the image input and output control apparatus according to the present embodiment will be described below with the use of FIG. 6 by taking a control procedure for the PDL printing session 501 and its components, the image input job 412 and the image output job 401, as a first example.

In a step S601 in the session control task (a), the user specifies printing conditions on the PC/WS 11. The printing conditions include the number of sets to be printed, an original size, a sheet size, the degree of enlargement or reduction, the use of one side or both sides, a layout, a page output order, the use of sorting, and the use of stapling. As an example, assume that the following printing conditions are set.

Number of sets to be printed: 10 (P1)
One-side printing: Yes (P2)
Original size: A4 (P3)
Sheet size: A4 (P4)
Degree of enlargement or reduction: 100% (P5)
Layout: None (P6)
Page output order: Ascending (P7)
Sorting: Yes (P8)
Stapling: Yes (P9)

After the foregoing printing conditions are set, the user gives a printing instruction on the PC/WS 11. Then, driver software installed in the PC/WS 11 converts the document data to be printed into so-called PDL data, and sends it together with the specified printing condition parameters (P1 to P9) to the computer interface section 7 in the image input and output control apparatus through a computer interface connected to the PC/WS 11.

The PDL data which expresses the image input through the computer interface section 7 is sent to the data processing section 121, and then to the RIP section 8. The RIP section 8 sequentially develops (rasterizes) the sent PDL data to image data. When the RIP section 8 starts receiving the PDL data, the RIP section 8 issues a processing request to the core section 10. The CPU 123 receives the issued processing request in the core section 10. The printing condition parameters P1 to P9 specified by the user are also sent to the CPU 123.

Figure 7:
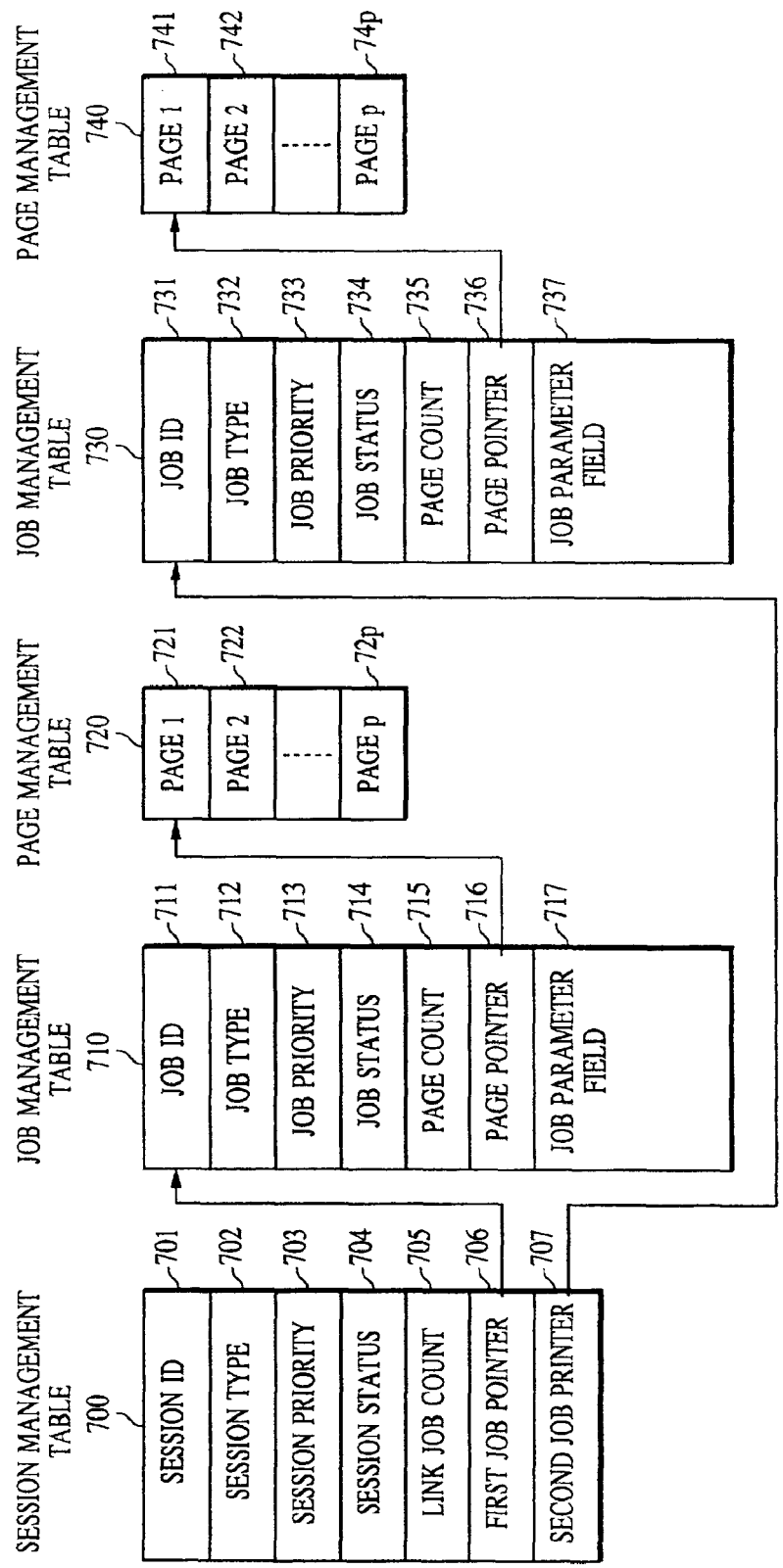
FIG. 7 is a view showing structures of a session management table, job management tables, and page management tables according to the embodiment.

In a step S602, the core section 10 divides the image processing function to be handled as a unit of processing, corresponding to the processing request issued by the RIP section 8 into at least one image input job or an image output job, internally generates a session formed of the image input job or the image output job, and manages it. FIG. 7 shows a session management table 700. The session management table 700 shown in FIG. 7 is generated in the memory 124, and each piece of information is held until the session is finished.

A session ID field 701 holds a unique session ID generated in the image input and output control apparatus. A session type field 702 specifies the type of the generated session, such as a PDL printing session, a copying session, a facsimile transmission session, a facsimile receiving session, or a scanning session. In this example, a PDL printing session is taken and recorded. A session priority field 703 holds the priority in a session processing order. A session status field 704 holds the execution status of the session, such as an execution-allowed status, a being-executed status, a suspended status, a finished status, or an error status, according to the execution status. A link-job-count field 705 holds the number of the image input jobs and the image output jobs constituting the session. In the present embodiment, since the PDL printing session 501 is formed of two jobs, the image input job 412 and the image output job 401, as shown in FIG. 5, this field holds "2" as the number of jobs. A first job pointer field 706 specifies a pointer of the image input job 412 to a job management table 710. A second job pointer field 707 specifies a pointer of the image output job 401 to a job management table 730. A job pointer field is prepared for each of all jobs constituting the session. A job management table is also prepared for each of all the jobs constituting the session.

In a step S603, the job management table 710 shown in FIG. 7, for the image input job 412 is generated in the memory 124, and each piece of information is maintained until the job is finished.

A job ID field 711 holds a unique job ID generated in the image input and output control apparatus. A job type field 712 specifies the type of the generated job, the image input job or the image output job described above. In this embodiment, the image input job 412, in which image data developed by the RIP section 8 is sequentially stored in the storage section 5, is recorded. A job priority field 713 holds the priority in a job processing order. A job status field 714 holds the execution status of the job, such as an execution-allowed status, an being-executed status, a suspended status, a finished status, or an error status, according to the execution status. A page-count field 715 holds the number of pages in the job. A page pointer field 716 specifies a pointer to a page management table 720 which describes detailed information of each page which the job manages. The page management table 720 is stored on the hard disk 6.

A job parameter field 717 holds various setting parameters for the job. In the present embodiment, the printing condition parameters P1 to P9, which have been specified in the step S601, are stored.

The session control task (a) generates the job management table 710, described above, for the image input job, and then starts the image-input-job control task (b).

In a step S604, a job management table 730 shown in FIG. 7 for the image output job 401 is generated in the memory 124, and each piece of information is maintained until the job is finished.

A job ID field 731 holds a unique job ID generated in the image input and output control apparatus. A job type field 732 specifies the type of the generated job, the image input job or the image output job described above. In this example, the image output job 401, in which image data stored in the storage section 5 is sequentially printed out at the printer section 2, is recorded. A job priority field 733 holds the priority in a job processing order. A job status field 734 holds the execution status of the job, such as an execution-allowed status, a being-executed status, a suspended status, a finished status, or an error status, according to the execution status. A page-count field 735 holds the number of pages in the job. A page pointer field 736 specifies a pointer to a page management table 740 which describes detailed information of each page which the job manages. The page management table 740 is actually the same as the page management table 720, stored in the hard disk 6 for the image input job 412.

A job parameter field 737 holds various setting parameters for the job. In the present example, the printing condition parameters P1 to P9 regarding the number of sets to be printed, a sheet size, the degree of enlargement or reduction, the use of one side or both sides, a page output order, the use of sorting, and the use of stapling, which have been specified in the step S601, are stored.

The session control task (a) generates the job management table 730, described above, for the image output job, and then starts the image-output-job control task (c).

In a step S605, the processing of the generated image input job 412 is started. In other words, the session control task (a) directs a job start to the image-input-job control task (b).

In a step S606, the processing of the generated image output job 401 is started. In other words, the session control task (a) directs a job start to the image-output-job control task (c).

In a step S607, the session control task (a) receives a notice of job finish from the image-input-job control task (b) and performs finish processing for the image input job. In other words, the job status 714 in the job management table 710 for the image input job is set to a finished status.

In a step S608, the session control task (a) receives a notice of job finish from the image-output-job control task (c) and performs job-end processing for the image output job. In other words, the job status 734 in the job management table 730 for the image output job is set to a finished status.

In a step S609, session end processing is performed. Namely, the job management tables 710 and 730 for the image input job and the image output job, and image data for each page in the page management tables 720 and 740 are discarded to release the memory resources. The session management table 700 is also discarded to release that memory resource. Thus, the series of processing has been finished.

The image-input-job control task (b) in the PDL printing session 501 will be described below.

In a step S611, the image-input-job control task (b) receives a job-start direction from the session control task (a). If another image input job is not being executed and a new image input job is allowed to be received, the directed job is started.

In a step S612, one page of image data developed by the RIP section 8 is received. The RIP section 8 sends an image to the data processing section 121 through the interface 120.

In a step S613, the image data sent to the data processing section 121 is temporarily stored in the page memory 125.

In a step S614, the image-input-job control task (b) sends a page output request to the image-output-job control task (c). When the image data of the page has been read from the page memory 125 in the image-output-job control task (c), described later, the image-input-job control task (b) proceeds to a step S615.

In the step S615, the image data temporarily stored in the page memory 125 is stored on the hard disk 6 of the storage section 5. At this time, various pieces of image attribute information, such as a resolution and the number of pixels, are stored in a page-1 field 721 in the page management table 720.

In a step S616, it is determined whether all pages of image data to be processed, which were developed by the RIP section 8, have been stored on the hard disk 6. If it is. found from the result of this determination that a page not yet processed remains, the processing is returned to the step S612. When it is found that all pages have been processed, the processing proceeds to a step S617.

In the step S617, the image-input-job control task (b) sends a job-end notice of the image input job to the session control task (a) and the task (b) is finished. With this operation, the job status 714 of the job management table 710 for the image input job is set to a finished status.

The image-output-job control task (c) in the PDL printing session 501 will be described below.

In a step S621, the image-output-job control task (c) receives a job-start direction from the session control task (a). If the printer section 2 is not used by another job and a new printing operation is allowed, the directed job is started.

In a step S622, the image-output-job control task (c) receives an output request of image data temporarily stored in the page memory 125, from the image-input-job control task (b).

In a step S623, reading of image data from the page memory 125 is started.

In a step S624, after the right to use the printer section 2 is obtained, the page of read image data is sent to the printer section 2 through the interface 122, the image is formed in the printer section 2 as described before, and the image is printed out.

In a step S625, it is determined whether a page output request from the image-input-job control task (b) is for the last page. If it is found from the result of this determination that a page not yet processed remains, the processing is returned to the step S622. When it is found that all pages have been processed, the processing proceeds to a step S626. With the processing performed so far, the first print set has been printed among the specified number of print sets, which has been set to 10 in P1. Staple processing may be executed for the printed output as required.

In a step S626, the image data for each page stored on the hard disk 6 of the storage section 5 in the step S615 of the image-input-job control task (b) is sequentially read and sent to the data processing section 121 through the interface 120. The data processing section 121 stores the sent image data of one page in the page memory 125.

In a step S627, after the right to use the printer section 2 is obtained, the image data sent to the data processing section 121 and stored in the page memory 125 is sent to the printer section 2 through the interface 122, the image is formed in the printer section 2, and the image is printed out.

In a step S628, it is determined whether all pages of image data stored in the hard disk 6 are printed out. If it is found from the result of this determination that a page not yet processed remains, the processing is returned to the step S626. When it is found that all pages have been processed, since a stapling direction has been specified, one set of printed sheets is stapled in the printer section 2, and the processing proceeds to a step S629.

In a step S629, it is determined whether the specified number of sets to be printed of the image data have been all printed out, which has been specified in the step S601. If it is found from the result of this determination that a print set not yet processed remains, the processing is returned to the step S626. The image data is read from the hard disk 6, stored in the page memory 125, and printed out in the printer section 2. When it is found that all print sets have been processed, the processing proceeds to a step S630.

In the step S630, the image-output-job control task (c) sends a job-end notice of the image output job to the session control task (a) and the task (c) is finished. With this operation, the job status 734 of the job management table 730 for the image output job is set to a finished status.

In the above example, the time required for the processing from its start, performed by directly reading the image data from the page memory, to the acquisition of the print out of a first set can be reduced. If the printer section 2 is occupied by an image output job of another session when the first set is to be printed, this new image output job (printing out) is suspended until the print operation being executed is finished. The processing from the step S622 to the step S625 are omitted in the image-output-job control task (c). When the print operation being executed is finished, the step S629 is changed to form a loop for 10 print sets and the 10 print sets are printed out with the use of the image data sent from the hard disk 6.

In the above example, the PDL printing session 501 shown in FIG. 5 has been described, in which image information is sent from the PC/WS 11 as PDL data according to the printing conditions specified on the PC/WS 11, the image input and output apparatus develops the PDL data to the image data and prints it. The same procedure can also be applied to the copying session 502 shown in FIG. 5, in which image information read by the reader section 1 is printed out.

Session control and job control in the image input and output apparatus according to the present embodiment will be described below with the use of FIG. 6 by taking a control procedure for the copying session 502 and its components, the image input job 411, in which image data read by the reader section 1 is sequentially stored into the storage section 5, and the image output job 401, in which image data stored in the storage section 5 is sequentially printed out at the printer section 2, as a second example.

In a step S601, the user specifies various copying conditions on the operation section 9 in the image input and output control section 3.

Figure 8:
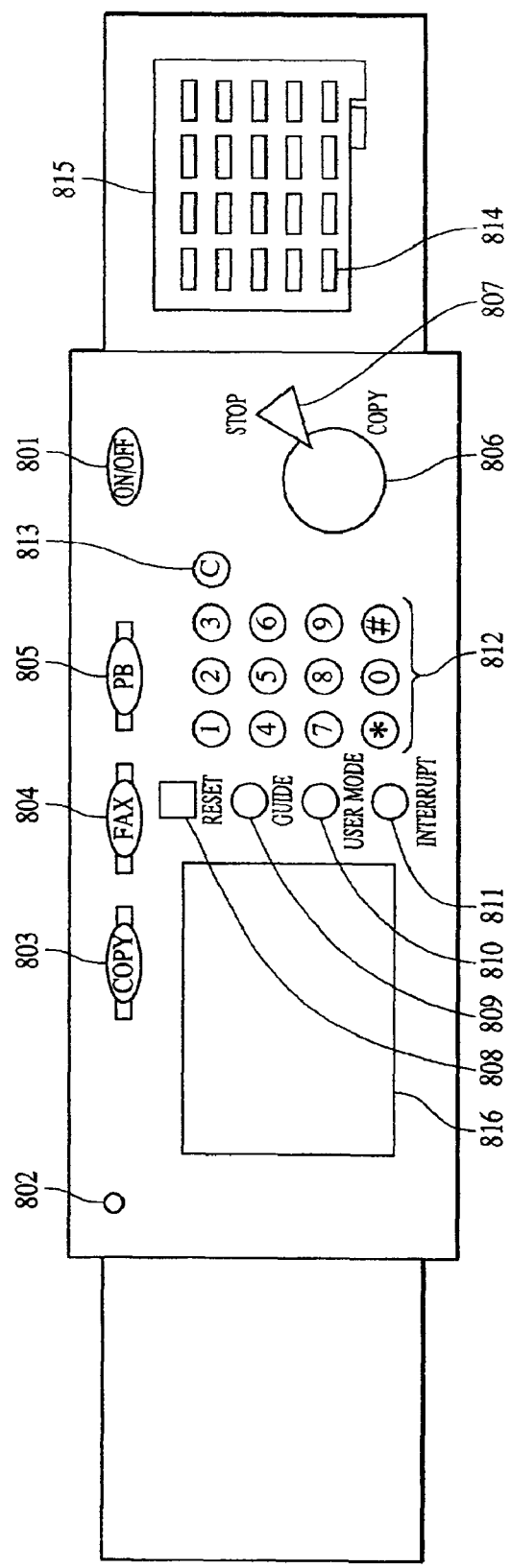
FIG. 8 is a plan of an operation section.

FIG. 8 is an outlined view of the operation section 9. In FIG. 8, there are shown a power key 801, a preheating key 802, a copy function selection key 803, a facsimile function selection key 804, a personal-box-function selection key 805, a start key 806, a stop key 807, a reset key 808, an operation guide key 809, a user-mode setting key 810, an interrupt copy key 811, a ten-key pad 812, a clear key 813, a facsimile single-stroke key 814, a cover for switching single-stroke keys 815, and a touch-sensitive panel 816. The various copying conditions include the number of sets to be copied, a sheet size, the degree of enlargement or reduction, the use of one side or both sides, the use of sorting, and the use of stapling. The user inputs conditions with the use of the ten-key pad 812 according to the setting items displayed on the touch-sensitive panel 816. As an example, assume that the following copying conditions are set.

Number of sets to be copied: 10 (C1)
One-side copying: Yes (C2)
Sheet size: A4 (C3)
Degree of enlargement or reduction: 100% (C4)
Layout: None (C5)
Sorting: Yes (C6)
Stapling: Yes (C7)

After the foregoing copying conditions are set, the user places an original on the reader section 1 and presses the start key 806 to give a copying instruction. The operation section 9 sends the copying condition parameters C1 to C7 to the CPU 123 in the core section 10 and issues a processing request.

In a step S602, the core section 10 divides the image processing function to be handled as a unit of processing, corresponding to the processing request issued by the operation section 9 into at least one image input job or an image output job, internally generates a session formed of the image input job or the image output job, and manages it with the session management table 700 shown in FIG. 7. Each piece of information is held until the session is finished.

A session ID field 701 holds a unique session ID generated in the image input and output control apparatus. A session type field 702 specifies the type of the generated session, such as a PDL printing session, a copying session, a facsimile transmission session, a facsimile receiving session, or a scanning session. In this example, a copying session is taken and recorded. A session priority field 703 holds the priority in a session processing order. A session status field 704 holds the execution status of the session, such as an execution-allowed status, a being-executed status, a suspended status, a finished status, or an error status, according to the execution status. A link-job-count field 705 holds the number of the image input jobs and the image output jobs constituting the session. In the present example, since the copying session 502 is formed of two jobs, the image input job 411 and the image output job 401, as shown in FIG. 5, this field holds "2" as the number of jobs. A first job pointer field 706 specifies a pointer of the image input job 411 to a job management table 710. A second job pointer field 707 specifies a pointer of the image output job 401 to a job management table 730.

In a step S603, the job management table 710 for the image input job 411 is generated in the memory 124, and each piece of information is maintained until the job is finished.

A job ID field 711 holds a unique job ID generated in the image input and output control apparatus. A job type field 712 specifies the type of the generated job, the image input job or the image output job described above. In this example, the image input job 411, in which image data read by the reader section 1 is sequentially stored into the storage section 5, is recorded. A job priority field 713 holds the priority in a job processing order. A job status field 714 holds the execution status of the job, such as an execution-allowed status, a being-executed status, a suspended status, a finished status, or an error status, according to the execution status. A page-count field 715 holds the number of pages in the job. A page pointer field 716 specifies a pointer to a page management table 720 which describes detailed information of each page which the job manages. The page management table 720 is stored in the hard disk 6.

A job parameter field 717 holds various setting parameters for the job. In the present example, the copying condition parameters C1 to C7, which have been specified in the step S601, are stored.

The session control task (a) generates the job management table 710 for the image input job, and then starts the image-input-job control task (b).

In a step S604, a job management table 730 shown for the image output job 401 is generated in the memory 124, and each piece of information is maintained until the job is finished.

A job ID field 731 holds a unique job ID generated in the image input and output control apparatus. A job type field 732 specifies the type of the generated job, the image input job or the image output job described above. In this example, the image output job 401, in which image data stored in the storage section 5 is sequentially printed out at the printer section 2, is recorded. A job priority field 733 holds the priority in a job processing order. A job status field 734 holds the execution status of the job, such as an execution-allowed status, a being-executed status, a suspended status, a finished status, or an error status, according to the execution status. A page-count field 735 holds the number of pages in the job. A page pointer field 736 specifies a pointer to a page management table 740 which describes detailed information of each page which the job manages. The page management table 740 is actually the same as the page management table 720, stored on the hard disk 6 for the image input job 411.

A job parameter field 737 holds various setting parameters for the job. In the present example, the copying condition parameters C1 to C7 regarding the number of sets to be copied, a sheet size, the degree of enlargement or reduction, the use of one side or both sides, the use of sorting, and the use of stapling, which have been specified in the step S601, are stored.

The session control task (a) generates the job management table 730 for the image output job, and then starts the image-output-job control task (c).

In a step S605, the processing of the generated image input job 411 is started. In other words, the session control task (a) directs a job start to the image-input-job control task (b).

In a step S606, the processing of the generated image output job 401 is started. In other words, the session control task (a) directs a job start to the image-output-job control task (c).

In a step S607, the session control task (a) receives a job end notice from the image-input-job control task (b) and performs job-end processing for the image input job. In other words, the job status 714 in the job management table 710 for the image input Job is set to a finished status.

In a step S608, the session control task (a) receives a notice of job finish from the image-output-job control task (c) and performs finish processing for the image output job. In other words, the job status 734 in the job management table 730 for the image output job is set to a finished status.

In a step S609, session end processing is performed. Namely, the job management tables 710 and 730 for the image input job and the image output job, and image data for each page in the page management tables 720 and 740 are discarded to release the memory resources. The session management table 700 is also discarded to release that memory resource. Thus, the series of processing has been finished.

The image-input-job control task (b) in the copying session 502 will be described below.

In a step S611, the image-input-job control task (b) receives a job-start direction from the session control task (a). If the reader section 1 is not used by another image input job and a new image input job is allowed to be received, the directed job is started.

In a step S612, one page of image data read by the reader section 1 is received. The reader section 1 sends an image to the data processing section 121 through the interface 120.

In a step S613, the image data sent to the data processing section 121 is temporarily stored in the page memory 125.

In a step S614, the image-input-job control task (b) sends a page output request to the image-output-job control task (c). When the image data of the page has been read from the page memory 125 in the image-output-job control task (c), the image-input-job control task (b) proceeds to a step S615.

In the step S615, the image data temporarily stored in the page memory 125 is stored on the hard disk 6 of the storage section 5. At this time, various pieces of image attribute information, such as a resolution and the number of pixels, are stored in a page-1 field 721 in the page management table 720.

In a step S616, it is determined whether all pages of image data to be processed, which were read by the reader section 1, have been stored in the hard disk 6. If it is found from the result of this determination that a page not yet processed remains, the processing is returned to the step S612. When it is found that all pages have been processed, the processing proceeds to a step S617.

In the step S617, the image-input-job control task (b) sends a job-end notice of the image input job to the session control task (a) and the task (b) is finished. With this operation, the job status 714 of the job management table 710 for the image input job is set to a finished status.

Since the processing from the step S621 in the image-output-job control task (c) for the copying session 502 is the same as that for the PDL printing session 501, the description thereof will be omitted.

In the foregoing examples, the PDL printing session 501 and the copying session 502 have been described. The control procedure shown in the present embodiment can also be applied to any session obtained by combining any image input job and any image output job, as shown in FIG. 5.

Figure 9:
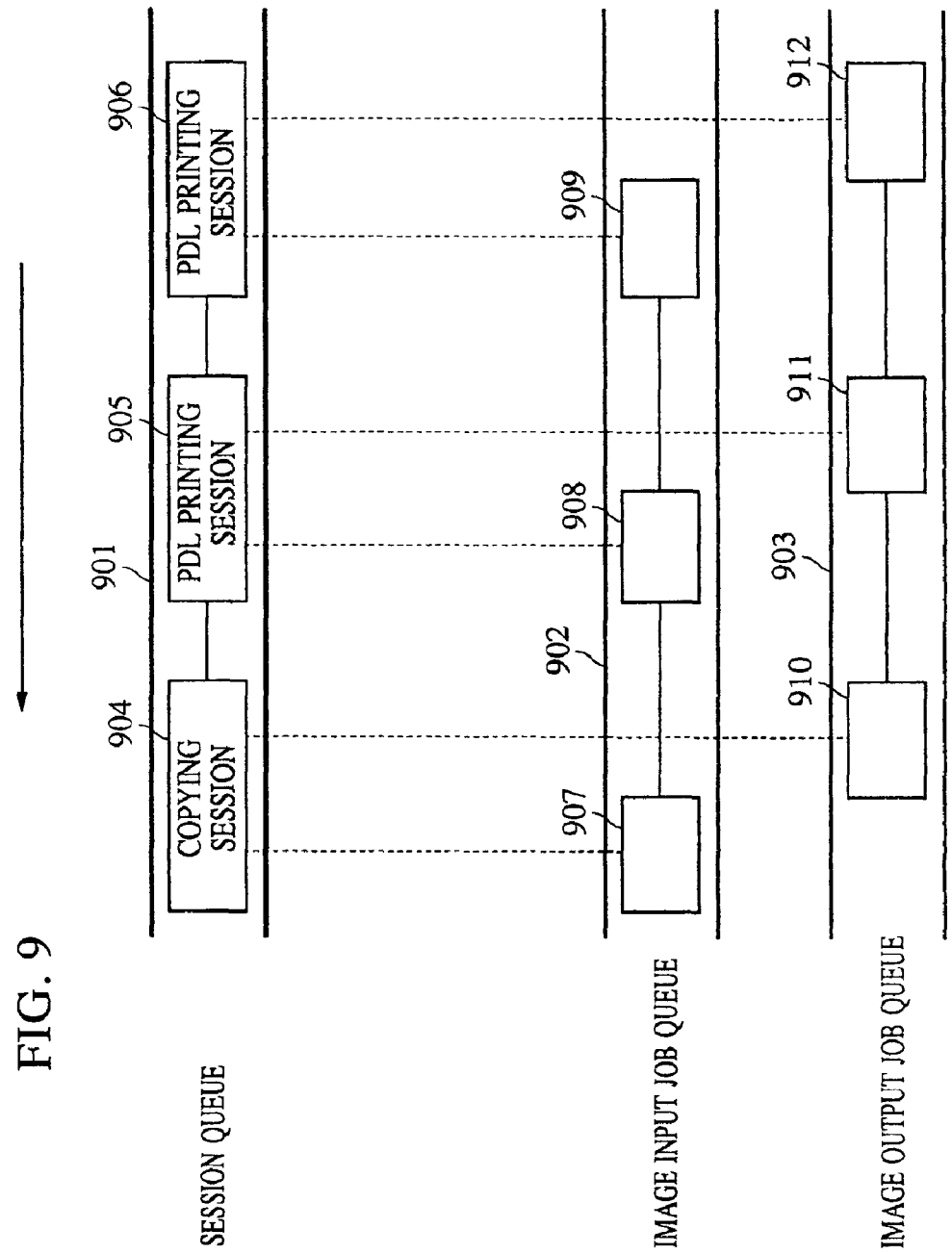
FIG. 9 is a view showing a session queue and job queues.

Concurrent operations of a plurality of sessions in the present embodiment will be described below by referring to FIG. 9. In FIG. 9, there is shown a session queue 901 which holds sessions each formed of at least one image input job or image output job, such as a copying session and a PDL printing session, in the order in which the sessions have been formed. In the present embodiment, a copying session 904, a PDL printing session 905, and a PDL copying session 906 are generated in this order.

There is also shown in FIG. 9 an image input job queue 902 which holds various image input jobs constituting the sessions in the order in which the jobs have been generated. This queue includes an image input job 907 generated by the copying session 904, an image input job 908 generated by the PDL printing session 905, and an image input job 909 generated by the PDL printing session 906.

An image output job queue 903 which holds various image output jobs constituting the sessions in the order in which the jobs have been generated is also illustrated in FIG. 9. This queue includes an image output job 910 generated by the copying session 904, an image output job 911 generated by the PDL printing session 905, and an image output job 912 generated by the PDL printing session 906.

FIG. 9 shows the order in which the sessions and jobs are processed. It does not indicate the starting time and the end time of each processing or the time required for each processing.

Figure 10:
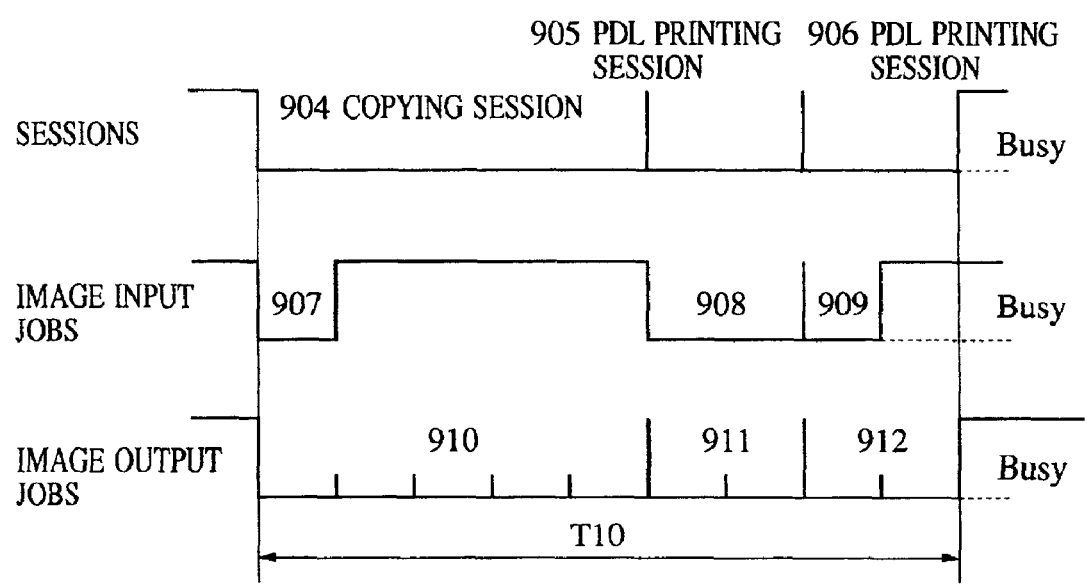
FIG. 10 is a timing chart showing operation timing of the sessions and jobs.

FIG. 10 is a timing chart indicating the operation timing of each session and its image input job and image output job.

Assume here that the number of sets to be copied is set to five in the copying session 904, the number of sets to be printed is set to one in the PDL printing session 905, and the number of sets to be printed is set to two in the PDL printing session 906. In other words, one set of image data is input to the hard disk 6 of the storage section 5 in the image input jobs 907, 908, and 909, and five sets of the image data are printed in the image output job 910, one set of the image data is printed in the image output job 911, and two sets of the image data are printed in the image output job 912.

In FIG. 10, the processing for the session 905 is started after the processing of the session 904 is finished, and the processing for the session 906 is started after the processing of the session 905 is finished. Overlapping processing is not performed for a plurality of sessions. In this case, the processing time for each session is specified by whichever takes a longer time between the image input job and the image output job of each session.

The copying session 904 is, for example, a combination of the image input job 907, in which one set of an original is read by the reader section 1 and stored in the page memory 125 or the hard disk 6 of the storage section 5, and the image output job 910, in which each page of the read image data is sequentially read from the page memory 125 or the hard disk 6 and five sets thereof are printed out. If the processing speed of the reader section 1 is identical to that of the printer section 2, the processing time for the image output job 910 is about five times that of the image input job 907. This means that the processing time of the copying session 904 is determined by the processing time of the image output job 910.

On the other hand, the PDL printing session 905 is a combination of the image input job 908, in which each page of image data developed by the RIP section 8 is stored into the page memory 125 or the hard disk 6 of the storage section 5, and the image output job 911, in which each page of the developed image data is sequentially read from the page memory 125 or the hard disk 6 and one set thereof is printed out. Since the processing speed of the RIP section 8 highly depends on the contents of the PDL data sent from the PC/WS 11, it is lower than the processing speed of the printer section 2 in many cases. In such a case, the processing time of the image output job 911 is synchronized with that of the image input job 908. This means that the processing time of the PDL printing session 905 is determined by that of the image input job 908.

Therefore, the total processing time T10 of all the queued sessions is equal to the sum of the processing times of the three sessions.

FIG. 11 is a timing chart in a case in which overlapping processing is performed for the plurality of sessions shown in FIG. 10.

In FIG. 11, the processing for the session 905 is started before the processing of the session 904 is finished, and the processing for the session 906 is started before the processing of the session 905 is finished. In this case, the processing time of a session is specified by the time period from the start of its image input job to the end of its image output job.

It is clearly shown in FIG. 11 that the processing end time of a subsequent session becomes earlier than that in the processing shown in the timing chart in FIG. 10. This is performed by overlapping processing for the plurality of sessions, in which, when an image output job which requires a plurality of sets to be printed exists in queued sessions, if the corresponding image input job has been finished, an image input job (for example, the image input job 908) in a subsequent session is started before the image output job (for example, the image output job 910) is finished, and thus parallel processing of the image input job and the image output job being executed is implemented.

As described above, according to the present embodiment, an image processing function, i.e., session, to be handled as a unit of processing is divided into a plurality of image input and output jobs, and a plurality of jobs related to different image processing functions are executed in parallel. With this method, a plurality of image processing functions can be handled at the same time and it becomes possible to provide an image input and output apparatus which requires a shorter waiting time period from the start of each of processes which a plurality of users require to the time when the desired results are obtained.

Therefore, in a versatile office machine having a plurality of functions, such as a copying function, a PDL printing function, a facsimile printing function, and a function for printing image data sent from a computer, it is possible to provide an image input and output apparatus in which a plurality of functions can be performed at the same time and a plurality of users have to wait for a little time for obtaining the desired results after the corresponding processes start.

Especially when processing which includes a plurality of sets to be output is required, a subsequent processing request can be quickly handled.

The individual components shown in outline or designated by blocks in the drawings are all well-known in the image processing arts and their specific construction and operation are not critical to the operation or best mode for carrying out the invention.

While the present invention has been described with reference to what are presently considered to be the preferred embodiment, it is to be understood that the invention is not limited to the disclosed embodiment. On the contrary, the invention is intended to cover various modifications and equivalent arrangements included within the spirit and scope of the appended claims.

What is claimed is:

1. An image input and output method in which image data is input from at least one image reader, and the image data is output to at least one printer, said method comprising the steps of:
   dividing image processing of one image processing unit to be performed into an image input job in which image data is input from the image reader and an image output job in which image data is output to the printer;
   managing execution of the image input job and execution of the image output job independently;
   determining an end of execution of the image input job; and
   after determining the end of execution of a first image input job, permitting the input of a second image input job during execution of the image output job corresponding to the first image input job, and then starting the second image input job while the image output job corresponding the first image input job is being executed.

2. An image input and output method according to claim 1, wherein image data is input and stored in an image storage section for the image input job, and image data is read from the image storage section and output in the image output job.

3. An image input and output method according to claim 1, wherein (i) the image data obtained by reading the original image, (ii) image data developed from code data expressing an image, and (iii) the image data received from the external unit are input in the image input job.

4. An image input and output method according to claim 1, wherein image data is output to at least one of a printer section printing an image and a transmission section transmitting an image in the image output job.

5. An image input and output method according to claim 1, further comprising the step of creating a plurality of management tables, which hold information used for managing the image input job and the image output job.

6. An image input and output method according to claim 5, wherein the execution of the image input job and that of the image output job are independently controlled in said controlling step according to the information held in the plurality of management tables.

7. An image input and output method according to claim 1, wherein said at least one image reader includes an interface section for connecting to a computer or a facsimile apparatus.

8. An image input and output apparatus comprising:
   input means for inputting image data from at least one image reader;
   output means for outputting image data to at least one image printer;
   obtaining means for obtaining image processing parameters, which regulate image processing of one image processing unit to be performed; and
   controlling means for controlling an input of image data and an output of image data according to the image processing parameter obtained by said obtaining means,
   wherein said controlling means:
      (i) divides the image processing of said one image processing unit expressed by the image processing parameters obtained by said obtaining means into an image input job in which image data is input by said image input means and an image output job in which image data is output by said output means;
      (ii) manages execution of the image input job and execution of the image output job independently;
      (iii) determines an end of execution of the image input job; and
      (iv) after the determination of the end of a first image input job, permits an input of a second image input job during execution of the image output job corresponding to the first image input job, and then starts the second image input job while the image output job corresponding the first image input job is being executed.

9. An image input and output apparatus according to claim 8, further comprising storage means for storing image data, wherein the image data input by said input means is stored in said image storage means in the image input job, and the image data read from said image storage means is output by said output means in the image output job.

10. An image input and output apparatus according to claim 8, wherein (i) the image data obtained by reading the original image, (ii) image data developed from code data expressing an image, and (iii) the image data received from the external unit are input by said input means in the image input job.

11. An image input and output apparatus according to claim 8, wherein image data is output by said output means to at least one of a printer section printing an image and a transmission section transmitting an image.

12. An image input and output apparatus according to claim 8, wherein said controlling means comprises a plurality of management tables, which hold information used for managing the image input job and the image output job.

13. An image input and output apparatus according to claim 12, wherein said controlling means independently controls the execution of the image input job and that of the image output job according to the information held in the plurality of management tables.

14. An image input and output apparatus according to claim 8, wherein said at least one image reader includes an interface section for connecting to a computer or a facsimile apparatus.

15. An image processing system in which image data input by at least one image input means is output by at least one image output means comprising:

obtaining means for obtaining image processing parameters, which regulate image processing of one image processing unit to be performed; and controlling means for controlling an input of image data and output of image data according to the image processing parameters obtained by said obtaining means, wherein said controlling means:
- (i) divides the image processing of said one image processing unit expressed by the image processing parameters obtained by said obtaining means into an image input job in which image data is input by the image input means and an image output job in which image data is output by said output means;
- (ii) manages execution of the image input job and execution of the image output job independently; and
- (iii) determines an end of execution of the image input job; and
- (iv) after the determination of the end of a first image input job, permits an input of a second image input job during execution of the image output job corresponding to the first image input job and then starts the second image input job while the image output job corresponding the first image input job is being executed.

16. An image processing system according to claim 15, further comprising storage means for storing image data, wherein the image data input by said input means is stored in said image storage means in the image input job, and the image data read from said image storage means is output by said output means in the image output job.

17. An image processing system according to claim 15, wherein said image means inputs (i) the image data obtained by reading the original image, (ii) image data developed from code data expressing an image, and (iii) the image data received from the external unit.

18. An image processing system according to claim 15, wherein said image output means performs at least one of image printing according to image data and image-data transmission.

19. An image processing system according to claim 15, wherein said controlling means comprises a plurality of management tables, which hold information used for managing the image input job and the image output job.

20. An image processing system according to claim 19, wherein said controlling means independently controls the execution of the image input job and that of the image output job according to the information held in the plurality of management tables.

21. An image processing system according to claim 15, wherein said at least one input means includes an interface section for connecting to a computer or a facsimile apparatus.

* * * * *

UNITED STATES PATENT AND TRADEMARK OFFICE
CERTIFICATE OF CORRECTION

PATENT NO. : 6,989,908 B1
APPLICATION NO. : 09/172261
DATED : January 24, 2006
INVENTOR(S) : Hirohiko Ito It is certified that error appears in the above-identified patent and that said Letters Patent is hereby corrected as shown below:

ON THE TITLE PAGE:
Item (57), Abstract, line 1, "Image is" should read --Image--.
Item (57), Abstract, line 2, "decided" should read --divided--.

COLUMN 12:
Line 34, "Job" should read --job--.

COLUMN 15:
Line 46, "corresponding" should read --corresponding to--.

COLUMN 16:
Line 34, "corresponding" should read --corresponding to--.

COLUMN 17:
Line 25, "corresponding" should read --corresponding to--.

Signed and Sealed this

Twenty-sixth Day of June, 2007

JON W. DUDAS
*Director of the United States Patent and Trademark Office*